United States Patent
Goldberg et al.

(10) Patent No.: US 7,028,055 B2
(45) Date of Patent: Apr. 11, 2006

(54) METHOD AND APPARATUS FOR IMPROVING TRANSACTION SPECIFICATION BY MARKING APPLICATION STATES

(75) Inventors: Robert N. Goldberg, Emerald Hills, CA (US); Yury Kamen, Foster City, CA (US); Syed M. Ali, Sunnyvale, CA (US); Bruce K. Daniels, Capitola, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 530 days.

(21) Appl. No.: 10/104,905

(22) Filed: Mar. 22, 2002

(65) Prior Publication Data

US 2003/0182318 A1 Sep. 25, 2003

(51) Int. Cl.
*G06F 17/30* (2006.01)

(52) U.S. Cl. ............................ 707/200; 707/1; 707/100

(58) Field of Classification Search .................. 705/1, 705/7, 8, 53, 54, 57, 64; 707/1–10, 100, 707/102, 103 R, 200, 201–206, 104.1; 709/297, 709/217, 227, 228, 249, 206; 719/313; 713/193
See application file for complete search history.

(56) References Cited

U.S. PATENT DOCUMENTS

| 5,325,528 A | * | 6/1994 | Klein ......................... 719/313 |
| 5,561,797 A | * | 10/1996 | Gilles et al. .................... 707/8 |
| 5,870,763 A | * | 2/1999 | Lomet ......................... 707/202 |

* cited by examiner

*Primary Examiner*—Shahid Alam
*Assistant Examiner*—Fred I. Ehichioya
(74) *Attorney, Agent, or Firm*—Osha Liang LLP (57) ABSTRACT

A method for marking a transaction, comprising defining an application as a plurality of states, wherein each of the plurality of states is associated with at least one transition, specifying a transaction set comprising at least one of the plurality of states, specifying a commit set comprising at least one of a plurality of states, and marking the transaction using a transaction marking procedure, wherein the transaction marking procedure marks the transaction based on the transaction set, the commit set, and at least one of the plurality of transitions.

9 Claims, 4 Drawing Sheets

METHOD AND APPARATUS FOR IMPROVING TRANSACTION SPECIFICATION BY MARKING APPLICATION STATES

BACKGROUND OF INVENTION

A transaction, in a computer system, is a sequence of information exchange and related work (such as database updating) that is treated as a unit for the purposes of satisfying a request and for ensuring database integrity. For a transaction to be completed and database changes to be made permanent, i.e., a commit transaction, a transaction has to be completed in its entirety. A typical transaction is a catalog merchandise order phoned in by a customer and entered into a computer by a customer representative. The order transaction involves checking an inventory database, confirming that the item is available, placing the order, confirming that the order has been placed, and determining the expected time of shipment. If the above mentioned steps defined a single transaction, then all of the steps must be completed before the transaction is successful. If something happens before the transaction is successfully completed, any changes to the database must be kept track of so that they can be undone, i.e., a rollback transaction.

To ensure that transactions are correctly identified within a computer system that uses them, an application must define and demark the transactions in some way. Specifically, the points of execution at which each transaction begins must be identified, and the points at which each transaction either commits (completes successfully) or rolls back (aborts) must also be identified.

Correct specification of transactions is complicated by the existence of errors within the application, which often are handled by exceptions that cause unexpected transfer of control out of the sequential transaction execution. If the application programmer does not identify all execution paths following the start of a transaction, including all possible error paths, a transaction may be left "dangling" and never end. This situation may cause the application to tie up scarce computer system resources, or to hold locks on critical data. Further, in some cases the error in the transaction coding may also cause a valid transaction to be rolled back if the transaction "times out," thus giving unintended results.

Additionally, with the growing number of commercial e-commerce applications and enterprise-wide applications today, there exists the notion of a business transaction, distinct from database transactions that are implemented in a Data Base Management System (DBMS). Specifically, business transactions may be implemented as multiple DBMS transactions. This further complicates specification of transactions.

Further, commercial e-commerce applications and enterprise wide applications are typically implemented to use "optimistic concurrency" within the application to avoid long-lived pessimistic transactions, since the latter tend to tie up resources and prevent the throughput and scalability required of e-commerce applications. When optimistic concurrency is used, the programming of transactions becomes even more complicated.

A number of solutions have been developed to simplify the task of specifying transactions. One solution involves inserting an explicit notation within the code of the application to specify the transaction, e.g., there may be a specific command to begin a transaction, and a command to either commit the transaction or roll back the transaction.

For example, applications that access a relational database at the level of Structured Query Language (SQL) queries may use SQL commands "BEGIN TRANSACTION", "COMMIT WORK", and "ROLLBACK WORK" to identify the scope of a transaction. To further ease the task of specifying a transaction, many DBMS's provide a simplified notion called "AUTOCOMMIT" whereby each query or method applied to the database implicitly starts a transaction just prior to the query or method call, and automatically commits that transaction upon completing the query or method call. One prior art solution that provides the above described functionality is Java™ Database Connective (JDBC™). Java™ and JDBC™ are pending trademarks of Sun Microsystems®, Inc. located in Palo Alto, Calif.

Another solution developed to simplify the complex task of specifying transactions allows application programmers to identify, on a per-method basis, which method calls must occur within a transaction, and which method calls define a transaction. One prior art solution that provides the above described functionality is Java™ 2 Enterprise Edition (J2EE™) Enterprise Java™ Beans (EJBs). EJBs define deployment descriptors by which the application programmer may specify transactional characteristics, e.g., specify the beginning of a transaction, conditions for a commit transaction, etc. J2EE™ is a pending trademark of Sun Microsystems®, Inc. located in Palo Alto, Calif.

SUMMARY OF INVENTION

In general, in one aspect, the invention relates to a method for marking a transaction, comprising defining an application as a plurality of states, wherein each of the plurality of states is associated with at least one transition, specifying a transaction set comprising at least one of the plurality of states, specifying a commit set comprising at least one of a plurality of states, and marking the transaction using a transaction marking procedure, wherein the transaction marking procedure marks the transaction based on the transaction set, the commit set, and at least one of the plurality of transitions.

In general, in one aspect, the invention relates to a method for marking a transaction, comprising defining an application as a plurality of states and a plurality of transitions, specifying a transaction set comprising at least one of the plurality of states, specifying a rollback set comprising at least one of a plurality of states, and marking the transaction using a transaction marking procedure, wherein the transaction marking procedure marks the transaction based on the transaction set and the rollback set.

In general, in one aspect, the invention relates to a method for marking a transaction, comprising obtaining an application specification defining an application as a plurality of states and a plurality of transitions, obtaining a transaction specification, and marking the transaction using a transaction marking procedure, wherein the transaction marking procedure marks the transaction based on the application specification and the transaction specification.

In general, in one aspect, the invention relates to a method for marking a transaction, comprising defining an application as a plurality of states, wherein each of the plurality of states is associated with at least one transition, specifying a transaction set comprising at least one of the plurality of states, specifying a commit set comprising at least one of a plurality of states, finding and marking all transition branches originating from one of the plurality of states not in the transaction set and terminating in one of the plurality of states in the transaction set with a begin transaction tag, finding and marking all transition branches originating from one of the plurality of states in the transaction set and terminating in one of the plurality of states in the commit set with a commit transaction tag, and finding and marking all transition branches originating from one of the plurality of states in the transaction set and terminating in one of the plurality of states not in the commit set with a rollback transaction tag.

In general, in one aspect, the invention relates to a method for marking a transaction, comprising defining an application as a plurality of states and a plurality of transitions, specifying a transaction set comprising at least one of the plurality of states, specifying a rollback set comprising at least one of a plurality of states, finding and marking all transition branches originating from one of the plurality of states not in the transaction set and terminating in one of the plurality of states in the transaction set with a begin transaction tag, finding and marking all transition branches originating from one of the plurality of states in the transaction set and terminating in one of the plurality of states in the rollback set with a rollback transaction tag, and finding and marking all transition branches originating from one of the plurality of states in the transaction set and terminating in one of the plurality of states not in the rollback set with a commit transaction tag.

In general, in one aspect, the invention relates to a method for marking a transaction, comprising obtaining an application specification defining an application as a plurality of states and a plurality of transitions, obtaining a transaction specification, wherein the transaction specification comprises a transaction set comprising at least one of the plurality of states, and a commit set comprising at least one of the plurality of states, deriving a rollback set comprising at least one of a plurality of states based on the transaction specification and the application specification, marking the transition with a begin tag, if the transition is initiated from one of the plurality of states not in the transaction set and terminates in one of the plurality of states in the transaction set, marking the transition with a commit tag, if the transition is initiated from one of the plurality of states in the transaction set and terminates in one of the plurality of states in the commit set, and marking the transition with a rollback tag, if the transition is initiated from one of the plurality of states in the transaction set and terminates in one of the plurality of states in the rollback set.

In general, in one aspect, the invention relates to a method for marking a transaction, comprising obtaining an application specification defining an application as a plurality of states and a plurality of transitions, obtaining a transaction specification, wherein the transaction specification comprises a transaction set comprising at least one of the plurality of states, and a rollback set comprising at least one of the plurality of states, deriving a commit set comprising at least one of a plurality of states based on the transaction specification and the application specification, marking the transition with a begin tag, if the transition is initiated from one of the plurality of states not in the transaction set and terminates in one of a plurality of states in the transaction set, marking the transition with a commit tag, if the transition is initiated from one of the plurality of states in the transaction set and terminates in one of the plurality of states in the commit set, and marking the transition with a rollback tag, if the transition is initiated from one of the plurality of states in the transaction set and terminates in one of the plurality of states in the rollback set.

In general, in one aspect, the invention relates to a method for marking a transaction, comprising obtaining an application specification defining an application as a plurality of states and a plurality of transitions, obtaining a transaction specification, wherein the transaction specification comprises a commit set comprising at least one of the plurality of states, and a rollback set comprising at least one of the plurality of states, specifying one of the plurality of states as a start state, deriving a transaction set comprising at least one of a plurality of states based on the transaction specification, the application specification, and the start state, marking the transition with a begin tag, if the transition is initiated from one of the plurality of states not in the transaction set and terminates in one of a plurality of states in the transaction set, marking the transition with a commit tag, if the transition is initiated from one of the plurality of states in the transaction set and terminates in one of the plurality of states in the commit set, and marking the transition with a rollback tag, if the transition is initiated from one of the plurality of states in the transaction set and terminates in one of the plurality of states in the rollback set.

In general, in one aspect, the invention relates to an apparatus for marking a transaction, comprising means for defining an application as a plurality of states, wherein each of the plurality of states is associated with at least one transition, means for specifying a transaction set comprising at least one of the plurality of states, means for specifying a commit set comprising at least one of a plurality of states, means for finding and marking all transition branches originating from one of the plurality of states not in the transaction set and terminating in one of the plurality of states in the transaction set with a begin transaction tag, means for finding and marking all transition branches originating from one of the plurality of states in the transaction set and terminating in one of the plurality of states in the commit set with a commit transaction tag, and means for finding and marking all transition branches originating from one of the plurality of states in the transaction set and terminating in one of the plurality of states not in the commit set with a rollback transaction tag.

In general, in one aspect, the invention relates to an apparatus for marking a transaction, comprising means for obtaining an application specification defining an application as a plurality of states and a plurality of transitions, means for obtaining a transaction specification, wherein the transaction specification comprises a commit set comprising at least one of the plurality of states, and a rollback set comprising at least one of the plurality of states, means for specifying one of the plurality of states as a start state, means for deriving a transaction set comprising at least one of a plurality of states based on the transaction specification, the application specification, and the start state, means for marking the transition with a begin tag, if the transition is initiated from one of the plurality of states not in the transaction set and terminates in one of a plurality of states in the transaction set, means for marking the transition with a commit tag, if the transition is initiated from one of the plurality of states in the transaction set and terminates in one of the plurality of states in the commit set, and means for marking the transition with a rollback tag, if the transition is initiated from one of the plurality of states in the transaction set and terminates in one of the plurality of states in the rollback set.

In general, in one aspect, the invention relates to an apparatus for marking a transaction, comprising means for obtaining an application specification defining an application as a plurality of states and a plurality of transitions, means for obtaining a transaction specification, wherein the transaction specification comprises a transaction set comprising at least one of the plurality of states, and a rollback set comprising at least one of the plurality of states, means for deriving a commit set comprising at least one of a plurality of states based on the transaction specification and the application specification, means for marking the transition with a begin tag, if the transition is initiated from one of the plurality of states not in the transaction set and terminates in one of a plurality of states in the transaction set, means for marking the transition with a commit tag, if the transition is initiated from one of the plurality of states in the transaction set and terminates in one of the plurality of states in the commit set, and marking the transition with a rollback tag, if the transition is initiated from one of the plurality of states in the transaction set and terminates in one of the plurality of states in the rollback set.

Other aspects and advantages of the invention will be apparent from the following description and the appended claims.

DETAILED DESCRIPTION

Exemplary embodiments of the invention will be described with reference to the accompanying drawings. Like items in the drawings are denoted by the same reference numbers through out for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
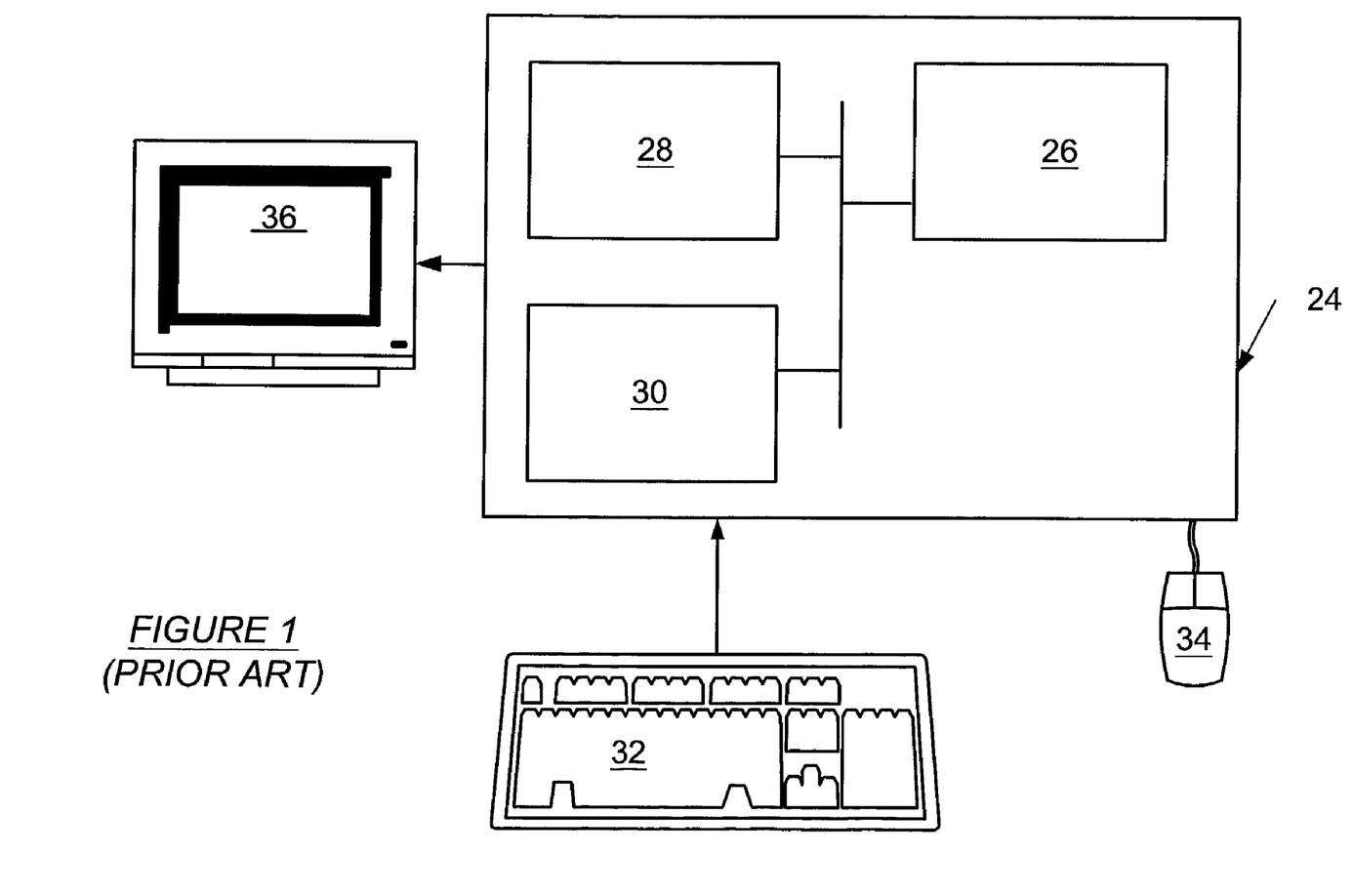
FIG. 1 illustrates a typical computer system.

The present invention may be implemented on virtually any type computer regardless of the platform being used. For example, as shown in FIG. 1, a typical computer (24) includes a processor (26), associated memory (28), a storage device (30), and numerous other elements and functionalities typical of today's computers (not shown). The computer (24) may also include input means, such as a keyboard (32) and a mouse (34), and output means, such as a monitor (36). Those skilled in the art will appreciate that these input and output means may take other forms in an accessible environment.

The invention relates to a method for automatically marking transactions within an application. Further, the invention relates to a means for specifying which states are in a transaction, which transitions from the states with the transaction result in a commit, and which transitions from the states with the transaction result in a rollback, to facilitate the automatic marking of the transaction.

Figure 2:
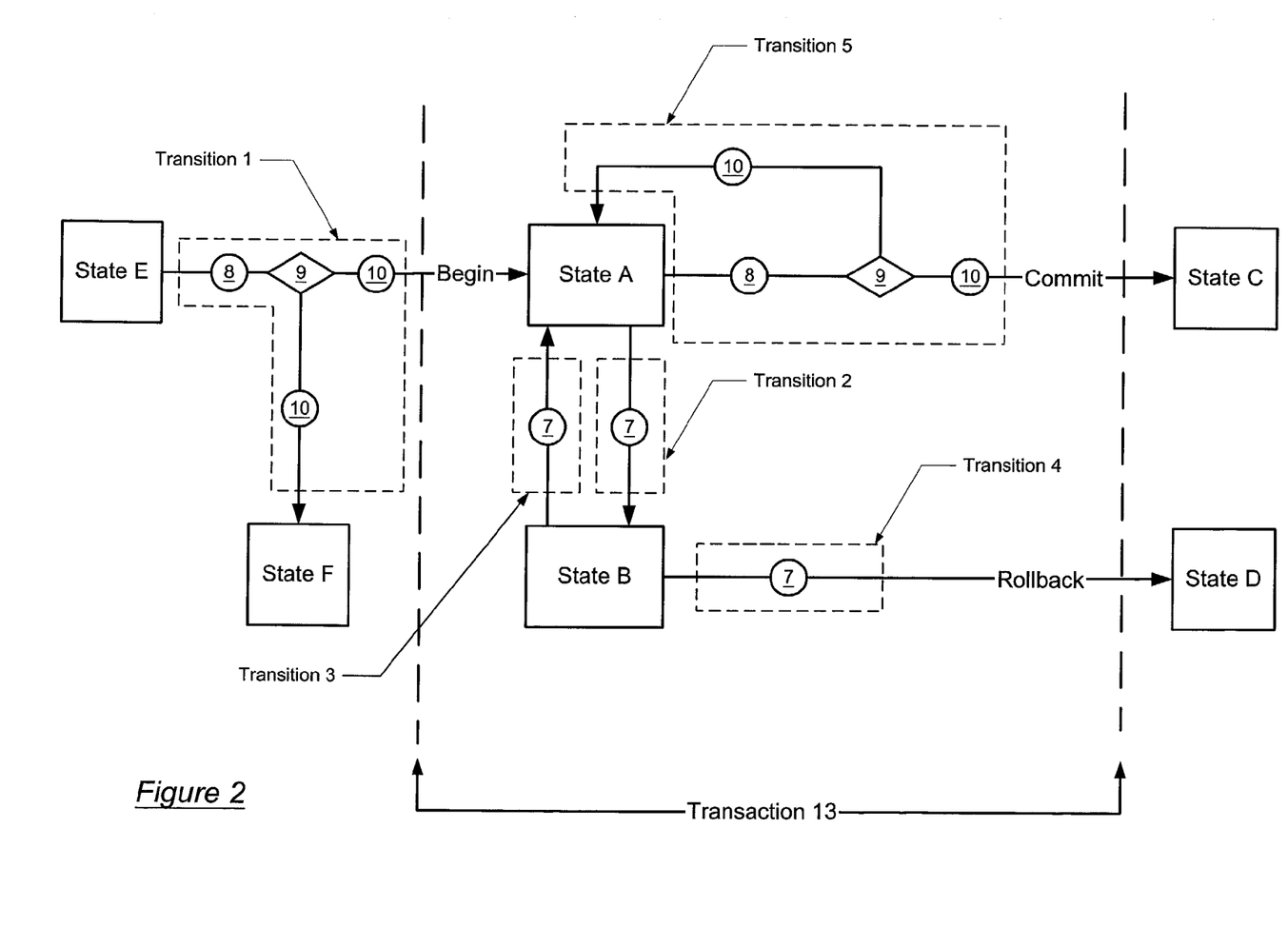
FIG. 2 illustrates a state-transition diagram of an application in accordance with one embodiment of the invention.

FIG. 2 illustrates a state-transition diagram of an application in accordance with one embodiment of the invention. The application shown in FIG. 2 is described as a series of states and transitions. The method of describing an application as a series of states and transitions is disclosed in U.S. Provisional Application Ser. No. 60/354,771 filed Feb. 6, 2002 entitled "Development and Generation of Enterprise Applications using a High-Level Specification", in the names of Bruce K. Daniels, Robert N. Goldberg, Yury Kamen, and Syed M. Ali. The state-transition diagram of the application shown in FIG. 2 includes six states (State A, State B, State C, State D, State E, and State F). Linking each state to at least one other state is a transition. For example, Transition 2 links State A with State B. Further, each transition is typically associated with some business logic. For example, in Transition 2, there is some business logic (7) that is performed prior to the application entering State B. Those skilled in the art will appreciate that while all business logic is denoted by the same reference number, it does not imply that all business logic is the same.

In one or more embodiments of the invention, there are two types of transitions: conditional transitions, and non-conditional transitions. Conditional transitions are transitions which have at least two potential paths to follow. For example, take the case of a login screen of an application. A user is prompted to enter a username and a password, and then click a "submit" at the bottom of the screen. During the transition, code (i.e., a Java™ script) that checks if the username and password are valid. If the username and password are valid, then the next screen shown to the user a "main menu" screen. However, if the username and password are not valid, then the user is returned to the login screen.

Thus, in FIG. 2, Transition 1 illustrates a conditional transition. In particular, there is some business logic (8) performed prior to the "branching" of the transition. Once this is complete, Transition 1 branches, as denoted by two potential paths exiting a decision block (9) within Transition 1. The decision block (9) is used to denote business logic used to determine which path the transition will take. Depending on the results of the business logic (8), Transition 1 may place the application in State F or State A. It is important to note that after the branching of the transition, additional business logic (10) may be performed. Transition 5 also illustrates a conditional transition. In particular, Transition 5 may place the application in State C or return the application back to State A.

In FIG. 2, business logic in a conditional transition is shown in three separate parts: business logic (8) proceeding the decision block, the decision block (9), and business logic following the decision block (10). The same reference number scheme has been used for all conditional transitions (Transition 1 and Transition 5) in FIG. 2. This particular reference numbering scheme was applied to simplify the example, and was not meant to limit the example. Further, while the business logic in the various conditional transitions is labeled the same, it does not imply that the code is the same or is required to be the same. Additionally, those skilled in the art will appreciate that business logic (8) proceeding the decision block (9), the decision block (9), and the business logic following the decision block (10) may be combined in various permutations as required and/or allowed by the application programming.

The non-conditional transitions only have one path. For example, Transition 2, in FIG. 2, will always take the application from State A to State B, regardless of business logic (7) processing during the transition. Similarly, Transition 3 and Transition 4 are also non-conditional transitions.

A transaction, in accordance with one embodiment of the invention, may include one or more states. Further, the transitions within a transaction, into a transaction and out of a transaction, may include conditional and non-conditional transitions. For example, referring to FIG. 2, State A and State B are inside the transaction (13), and State C, State D, State E, and State F are outside the transaction (13). Further, Transition 1, a conditional transition, may place the application into the transaction (13), specifically placing the application in State A. Within the transaction (13),there are conditional transitions (Transition 5) and non-conditional transitions (Transition 2, Transition 3, and Transition 4). Finally, to exit the transaction (13), there is a non-conditional transition (Transition 4) and a conditional transition (Transition 5).

As noted in the background, there are two potential results of a particular transaction: commit and rollback. In this particular case, the transition from State A to State C (Transition 5) results in the transaction (13) being committed. In contrast, the transition from State B to State D (Transition 4) results in a rollback.

In accordance with one or more embodiments of the invention, the following Application Specification may be used to describe the application shown in FIG. 2.

Code Sample 1: Application Specification

```
1.  A State { . . .
2.      Transition 2 {  Return new B ( ) }
3.      Transition 5 {  if X = Y then
4.                          Return new A( )
5.                      else
6.                          Return new C( )
7.                  }
8.  }
9.
10. B State { . . .
11.     Transition 3 { . . .
12.                     Return new A { }
13.                 }
14.     Transition 4 {
15.                     Return new B { }
16.                 }
17. }
18.
19. C State { . . . }
20. D State { . . . }
21. E State { . . .
22.         Transition 1 { switch (name) {
23.                         Case "" : Return new B ( )
24.                         Default : return new F ( )
25.                     }
26.                 }
27. }
28. F State { . . . }
```

In the above code sample, lines 1–8 define State A, lines 10–17 define State B, line 19 defines State C, line 20 defines State D, lines 21–27 define State E, and line 28 defines State F. Process/Business logic and other information that is typically required to define a state is denoted as ". . . ".

In accordance with one embodiment of the invention, the following Transaction Specification may be used to denote the transaction (13) shown in FIG. 2.

Code Sample 2: Transaction Specification

1. Transaction (A, B, Commit C)

In the above code sample, line 1 defines the transaction. While only one transaction is specified in Code Sample 2, those skilled in the art will appreciate that an application may specify multiple transactions. Further, those skilled in the art will appreciate that a particular transaction may not transition to a state that results in rollback.

In this particular case, the transaction specification (line 1 in Code Sample 2) specifies that State A and State B make up the action and that a transition to State C will result in a commit. Those skilled in the art will appreciate that if a transaction is made up of more than one state, then each of the states within the transaction must be linked to at least one other state in the transaction via a transition. Further, specifying that a transition to a particular state results in a commit or a rollback requires that the particular state be linked to at least one state in the transaction. Further, those skilled in the art will appreciate that a transition to a particular state outside a transition may be specified as either resulting in a commit or a rollback.

While Code Sample 2 specifies the transaction by defining the states in the transaction and the states that result in a commit, those skilled in the art will appreciate that the transactions specification could specify the states resulting in a rollback instead of states resulting in a commit. For example, Line 1 in Code Sample 2 could be specified as: Transaction (A, B, Rollback D).

Additionally, the transaction may be specified by defining the states that result in a rollback and states that result in a commit. For example, Line 1 in Code Sample 2 could be specified as: Transaction (Commit C, Rollback D). Those skilled in the art will appreciate that by providing two of the three sets of states in the transaction specification, i.e., states in the transaction, states resulting in a commit, and states resulting in a rollback, the third set may be derived.

For example, by specifying the states in the transaction and states resulting in a commit, the states resulting in a rollback may be derived. Referring to FIG. 2, if State A and State B are specified as making up the transition, then State C, State D, State E, and State F are known not to be in the transaction. Further, State C is specified as a state resulting in a commit. With this information and the application specification (e.g., Code Sample 1), it may be readily determined that State D is the only other state that the application may transition to when the transaction is exited. Since this state is not specified as a state resulting in a commit, transition to State D must result in a rollback. State E and State F are not considered as they cannot be transitioned to from a state within the transaction. The same reasoning may be applied when a rollback set is specified instead of a commit set.

Those skilled in the art will appreciate that if only a rollback set and a commit set are specified, an additional piece of information is required to determine the states that make up a particular transition. This piece of information is which state is the "start state" of the application. The start state refers to the initial state of the application when it is first started, e.g., a home page in a web application. Referring to FIG. 2, if the transaction specification (line 1 in Code Sample 2) is: Transaction (Commit C, Rollback D), then it is readily discernable that States A and B are part of the transaction. This determination is made by using application specification (e.g., Lines 1–28 in Code Sample 1) and noting that State C and State D may only be reached via State A and B, respectively. However, this information does not provide any indication of whether State E and State F are in the transaction. If State E is designated as a start state, then State E cannot be part of the transaction. Since State E is not part of the transaction, then State F also is not part of the transaction, as State F is not linked via a transition to either State A or State B.

Figure 3:
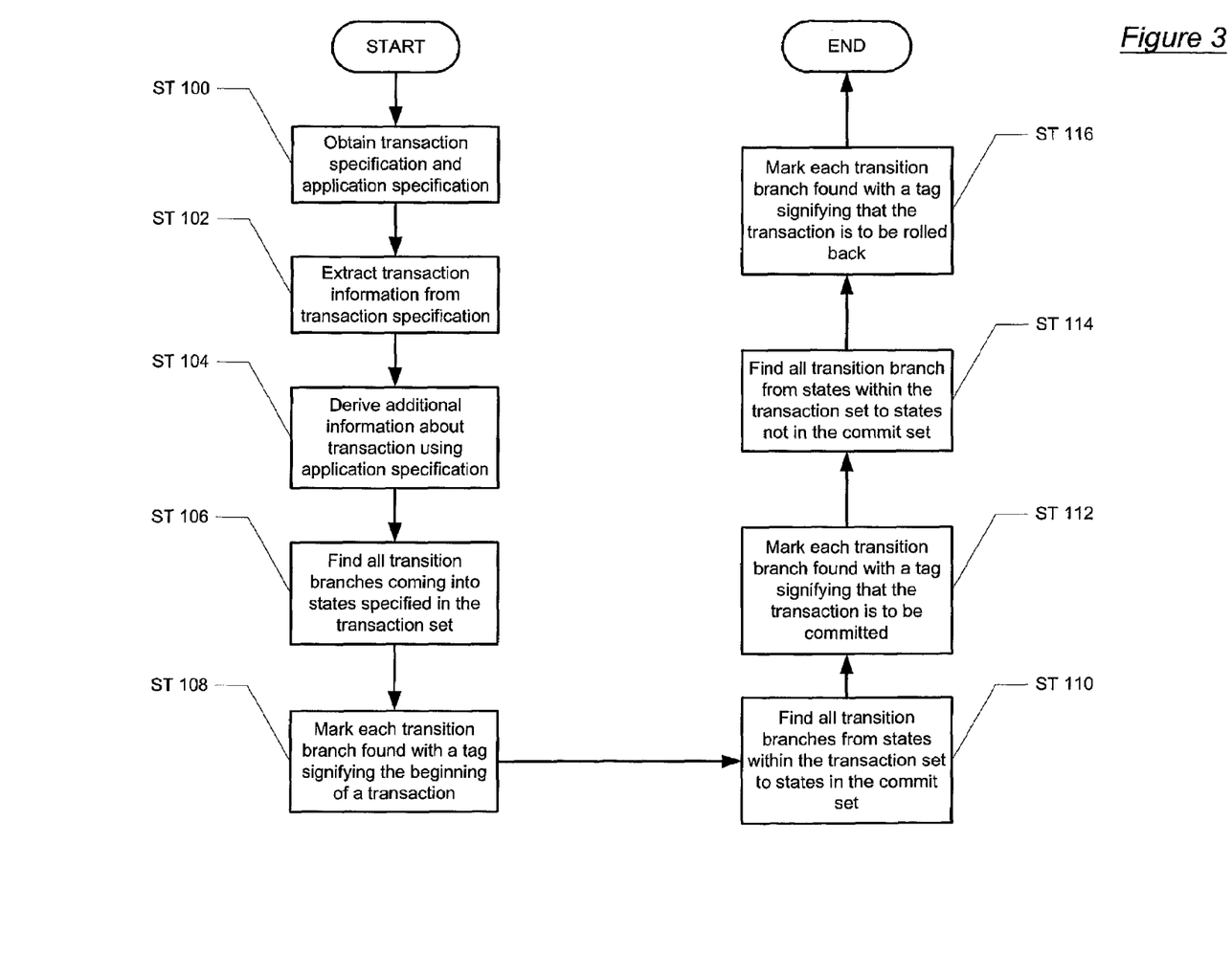
FIG. 3 illustrates a method for marking a transaction in accordance with one embodiment of the invention.

FIG. 3 illustrates a method for marking transactions in accordance with one embodiment of the invention. A transaction specification (e.g., line 1 in Code Sample 2) and an application specification (e.g., lines 1–28 in Code Sample 1)

are initially obtained (Step 100). Information regarding states involved in a transaction (i.e., a transaction set), states resulting in a commit (i.e., a commit set), and states resulting in a rollback (i.e., rollback set) are obtained from the transaction specification (Step 102). As noted above, only information for two of the three sets will be explicitly defined in the transaction specification. The states involved in the third set are derived using the transaction specification and the application specification (Step 104). Using information about the three sets (i.e., transaction set, commit set, and rollback set) and the application specification, a search is performed to find all transition branches that terminate in a state listed in the transaction set (Step 106). In the context of a conditional transition, a transition branch refers to a potential path that a transition may follow. In the context of a non-conditional transition, a transition branch refers to the transition path.

Returning to FIG. 3, each of the transition branches terminating in a state within the transaction set is marked with a tag signifying the beginning of a transaction (Step 108). The tag is typically specific to the particular platform controlling the transaction. Further, in one embodiment of the invention, a transition may include business logic (7 in FIG. 2). In this case, the tag is placed after the completion of the business logic (Transition 1 in FIG. 2).

Returning to FIG. 3, the application specification and the information about the three sets are used to find all transition branches that initiate in a state within the transaction set and terminate in a state listed in the roll backset (Step 110). Each of the transition branches found is subsequently tagged specifying that a commit is to take place (Step 112). Further, in one embodiment of the invention, a transition may include business logic (e.g., 7 in FIG. 2). In this case, the tag is placed after the completion of the business logic.

The application specification and the information about the three sets are used to find all transition branches that initiate in a state within the transaction set and terminate in a state listed in the rollback set (Step 114). Each of the transition branches found is subsequently tagged specifying that a rollback is to take place (Step 116). Further, in one embodiment of the invention, a transition may include business logic (7 in FIG. 2). In this case, the tag is placed after the completion of the business logic (Transition 4 in FIG. 2).

Those skilled in the art will appreciate that the placement of the tags (i.e., tags specifying the beginning of a transaction, etc.) is dependent on the underlying system upon which the application is running. Specifically, the placement is dependent on the particular DBMS and DBMS rules. Thus, in one or more embodiments of the invention, functionality is included to account for particular DBMSs and DBMS rules during the placement of the particular tags.

While the above method only described placing tags specifying, for example, the beginning of a transaction, those skilled in the art will appreciate that additional code may also be inserted. The code may be used to increase the functionality of the particular action denoted by the tag. For example, a particular platform may require specific conditions be met prior to a commit occurring that are not normally considered by the underlying DBMS. Thus, code may be inserted prior to the commit tag to check for the specified constraints.

Figure 4:
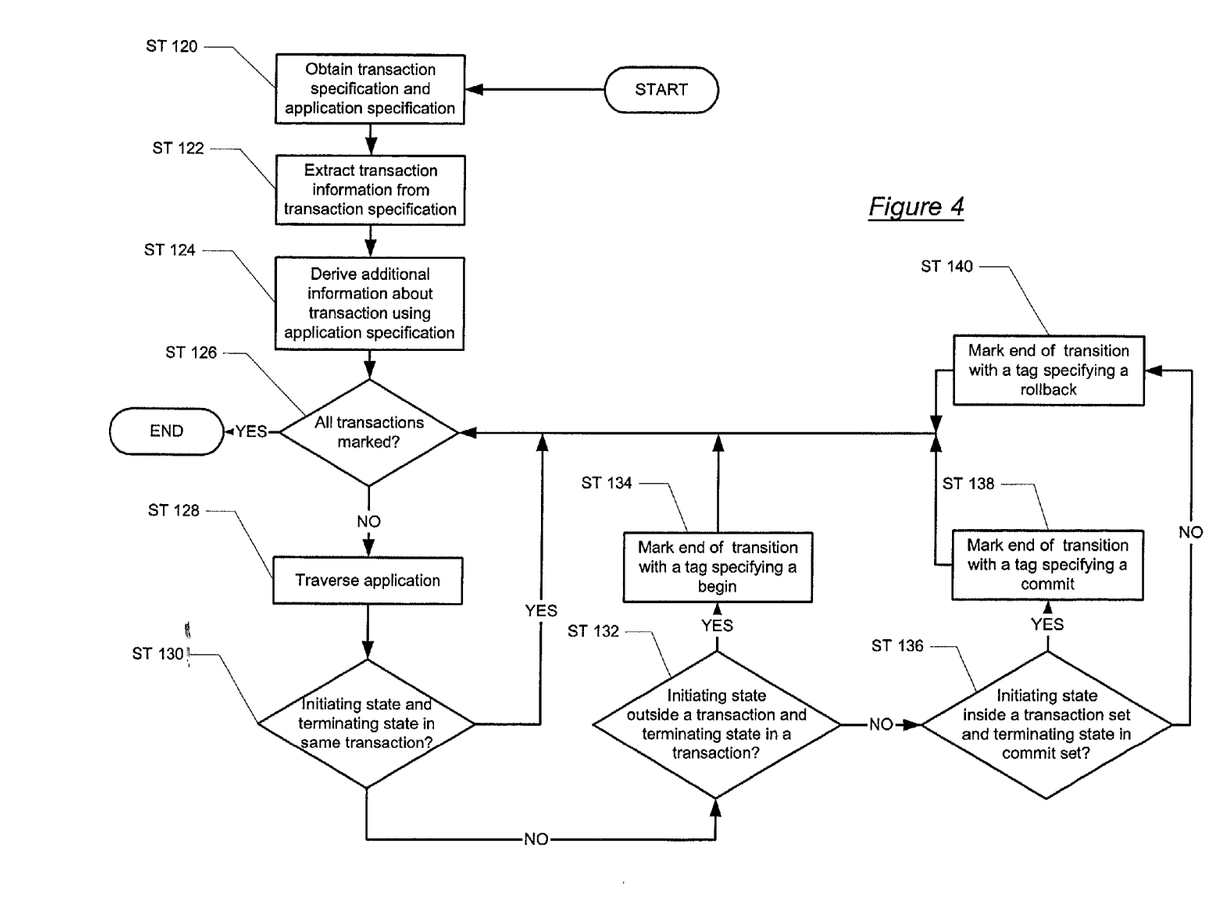
FIG. 4 illustrates a method for marking a transaction in accordance with another embodiment of the invention.

FIG. 4 illustrates a method for marking transactions in accordance with another embodiment of the invention. A transaction specification (e.g., line 1 in Code Sample 2) and an application specification (e.g., lines 1–28 in Code Sample 1) are initially obtained (Step 120). Information regarding states involved in a transaction (i.e. a transaction set), states resulting in a commit (i.e., a commit set), and states resulting in a rollback (i.e., rollback set) are obtained from the transaction specification (Step 122). As noted above, only information for two of the three sets will be explicitly defined in the transaction specification. The states involved in the third set are derived using the transaction specification and the application specification (Step 124).

If all transactions have been marked (Step 126), then the method is complete. If all transactions have not been marked, then the application is traversed (Step 128). All transactions are deemed to the marked if all transition branches terminating in a state within the transaction or exiting the transaction have been marked. The traversal of the application includes following each transition branch within the application. In one embodiment of the invention, the traversal of the application is accomplished using a recursive algorithm.

Returning to FIG. 4, if the transition branch encountered during the traversal is initiated in a state belonging to a particular transaction and terminates in a state belonging to the same transaction (Step 130), then the transition is not marked and the method returns to Step 126. If the transition branch encountered during the traversal is initiated in a state outside the transaction and terminates in a state belonging to the transaction (Step 132), then the transition is marked with a tag specifying a begin transaction (Step 134). The method then proceeds to Step 126.

If the transition branch encountered during the traversal is initiated in a state inside the transaction and terminates in a state within the commit set (Step 136), then the transition is marked with a tag specifying a commit transaction (Step 138). The method then proceeds to Step 126. If the terminating state is not in the commit set (Step 136), then the transition is marked with a tag specifying a rollback transaction (Step 138). The method then proceeds to Step 126.

Those skilled in the art will appreciate that the determinations made in Step 130, Step 132, and Step 136 may be accomplished using the transaction set, the commit set, and the rollback set. Further, those skilled in the art will appreciate that Step 136 may test if a particular state is in the rollback set as opposed to the commit set, without detracting from the invention.

In one or more embodiments of the invention, whenever a tag specifying a commit or rollback is added to the code, it is followed by a tag specifying a begin. This embodiment is typically used when there are multiple transactions and each state belongs in a transaction.

Those skilled in the art will appreciate that while the above discussion only describes an application with one transaction, the invention may be used to mark multiple transactions.

The invention has one or more of the following advantages. The invention allows a transaction to be simply specified in only one place and at a high level. Further, the invention automates the placement of transaction code into the application, thereby reducing coding errors and reducing the possibility of missing potential transition branches when coding.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for marking a transaction, comprising:
    defining an application as a plurality of states, wherein each of the plurality of states is associated with at least one transition;
    specifying a transaction set comprising at least one of the plurality of states;
    specifying a commit set comprising at least one of a plurality of states;
    marking the transaction using a transaction marking procedure, wherein the transaction marking procedure marks the transaction based on the transaction set, the commit set, and at least one of the plurality of transitions;
    marking all transition branches originating from one of the plurality of states not in the transaction set and terminating in one of the plurality of states in the transaction set with a begin transaction tag;
    marking all transition branches originating from one of the plurality of states in the transaction set and terminating in one of the plurality of states in the commit set with a commit transaction tag; and
    marking all transition branches originating from one of the plurality of states in the transaction set and terminating in one of the plurality of states not in the commit set with a rollback transaction tag.

2. A computer-implemented method for marking a transaction, comprising:
    obtaining an application specification defining an application as a plurality of states and a plurality of transitions;
    obtaining a transaction specification; and
    marking the transaction using a transaction marking procedure, wherein the transaction marking procedure marks the transaction based on the application specification and the transaction specification, wherein the transaction specification comprises a transaction set comprising at least one of the plurality of states, and a commit set having at least one of the plurality of states;
    deriving a rollback set having at least one of a plurality of states based on the transaction specification and the application specification;
    marking the transition with a begin tag, if the transition is initiated from one of the plurality of states not in the transaction set and terminates in one of the plurality of states in the transaction set;
    marking the transition with a commit tag, if the transition is initiated from one of the plurality of states in the transaction set and terminates in one of the plurality of states in the commit set; and
    marking the transition with a rollback tag, if the transition is initiated from one of the plurality of states in the transaction set and terminates in one of the plurality of states in the rollback set.

3. A computer-implemented method for marking a transaction, comprising:
    obtaining an application specification defining an application as a plurality of states and a plurality of transitions;
    obtaining a transaction specification; and
    marking the transaction using a transaction marking procedure, wherein the transaction marking procedure marks the transaction based on the application specification and the transaction specification, wherein the transaction specification comprises a transaction set having at least one of the plurality of states, and a rollback set having at least one of the plurality of states;
    deriving a commit set having at least one of a plurality of states using the transaction specification and the application specification;
    marking the transition with a begin tag, if the transition is initiated from one of the plurality of states not in the transaction set and terminates in one of a plurality of states in the transaction set;
    marking the transition with a commit tag, if the transition is initiated from one of the plurality of states in the transaction set and terminates in one of the plurality of states in the commit set; and
    marking the transition with a rollback tag, if the transition is initiated from one of the plurality of states in the transaction set and terminates in one of the plurality of states in the rollback set.

4. A computer-implemented method for marking a transaction, comprising:
    obtaining an application specification defining an application as a plurality of states and a plurality of transitions;
    obtaining a transaction specification; and
    marking the transaction using a transaction marking procedure, wherein the transaction marking procedure marks the transaction based on the application specification and the transaction specification, wherein the transaction specification comprises a rollback set comprising at least one of the plurality of states, and a commit set comprising at least one of the plurality of states;
    specifying one of the plurality of states as a start state;
    deriving a transaction set comprising at least one of a plurality of states based on the transaction specification, the application specification, and the start state;
    marking the transition with a begin tag, if the transition is initiated from one of the plurality of states not in the transaction set and terminates in one of a plurality of states in the transaction set;
    marking the transition with a commit tag, if the transition is initiated from one of the plurality of states in the transaction set and terminates in one of the plurality of states in the commit set; and
    marking the transition with a rollback tag, if the transition is initiated from one of the plurality of states in the transaction set and terminates in one of the plurality of states in the rollback set.

5. A computer-implemented method for marking a transaction, comprising:
    obtaining an application specification defining an application as a plurality of states and a plurality of transitions;
    obtaining a transaction specification, wherein the transaction specification comprises a transaction set comprising at least one of the plurality of states, and a commit set comprising at least one of the plurality of states;
    deriving a rollback set comprising at least one of a plurality of states based on the transaction specification and the application specification;
    marking the transition with a begin tag, if the transition is initiated from one of the plurality of states not in the transaction. set and terminates in one of the plurality of states in the transaction set;
    marking the transition with a commit tag, if the transition is initiated from one of the plurality of states in the transaction set and terminates in one of the plurality of states in the commit set; and marking the transition with a rollback tag, if the transition is initiated from one of the plurality of states in the transaction set and terminates in one of the plurality of states in the rollback set.

6. A computer-implemented method for marking a transaction, comprising:

obtaining an application specification defining an application as a plurality of states and a plurality of transitions;

obtaining a transaction specification, wherein the transaction specification comprises a transaction set comprising at least one of the plurality of states, and a rollback set comprising at least one of the plurality of states;

deriving a commit set comprising at least one of a plurality of states based on the transaction specification and the application specification;

marking the transition with a begin tag, if the transition is initiated from one of the plurality of states not in the transaction set and terminates in one of a plurality of states in the transaction set;

marking the transition with a commit tag, if the transition is initiated from one of the plurality of states in the transaction set and terminates in one of the plurality of states in the commit set; and marking the transition with a rollback tag, if the transition is initiated from one of the plurality of states in the transaction set and terminates in one of the plurality of states in the rollback set.

7. A computer-immplemented method for marking a transaction, comprising:

obtaining an application specification defining an application as a plurality of states and a plurality of transitions;

obtaining a transaction specification, wherein the transaction specification comprises a commit set comprising at least one of the plurality of states, and a rollback set comprising at least one of the plurality of states;

specifying one of the plurality of states as a start state;

deriving a transaction set comprising at least one of a plurality of states based on the transaction specification, the application specification, and the start state;

marking the transition with a begin tag, if the transition is initiated from one of the plurality of states not in the transaction set and terminates in one of a plurality of states in the transaction set;

marking the transition with a commit tag, if the transition is initiated from one of the plurality of states in the transaction set and terminates in one of the plurality of states in the commit set; and marking the transition with a rollback tag, if the transition is initiated from one of the plurality of states in the transaction set and terminates in one of the plurality of states in the rollback set.

8. An apparatus for marking a transaction, comprising:

means for obtaining an application specification defining an application as a plurality of states and a plurality of transitions;

means for obtaining a transaction specification, wherein the transaction specification comprises a commit set comprising at least one of the plurality of states, and a rollback set comprising at least one of the plurality of states;

means for specifying one of the plurality of states as a start state;

means for deriving a transaction set comprising at least one of a plurality of states based on the transaction specification, the application specification, and the start state;

means for marking the transition with a begin tag, if the transition is initiated from one of the plurality of states not in the transaction set and terminates in one of a plurality of states in the transaction set;

means for marking the transition with a commit tag, if the transition is initiated from one of the plurality of states in the transaction set and terminates in one of the plurality of states in the commit set; and means for marking the transition with a rollback tag, if the transition is initiated from one of the plurality of states in the transaction set and terminates in one of the plurality of states in the rollback set.

9. An apparatus for marking a transaction, comprising:

means for obtaining an application specification defining an application as a plurality of states and a plurality of transitions;

means for obtaining a transaction specification, wherein the transaction specification comprises a transaction set comprising at least one of the plurality of states, and a rollback set comprising at least one of the plurality of states;

means for deriving a commit set comprising at least one of a plurality of states based on the transaction specification and the application specification;

means for marking the transition with a begin tag, if the transition is initiated from one of the plurality of states not in the transaction set and terminates in one of a plurality of states in the transaction set;

means for marking the transition with a commit tag, if the transition is initiated from one of the plurality of states in the transaction set and terminates in one of the plurality of states in the commit set; and marking the transition with a rollback tag, if the transition is initiated from one of the plurality of states in the transaction set and terminates in one of the plurality of states in the rollback set.

* * * * *